June 29, 1954  J. R. WOODYARD ET AL  2,682,623
ELECTRICAL FREQUENCY CONTROL APPARATUS
Filed Dec. 6, 1943  3 Sheets-Sheet 1
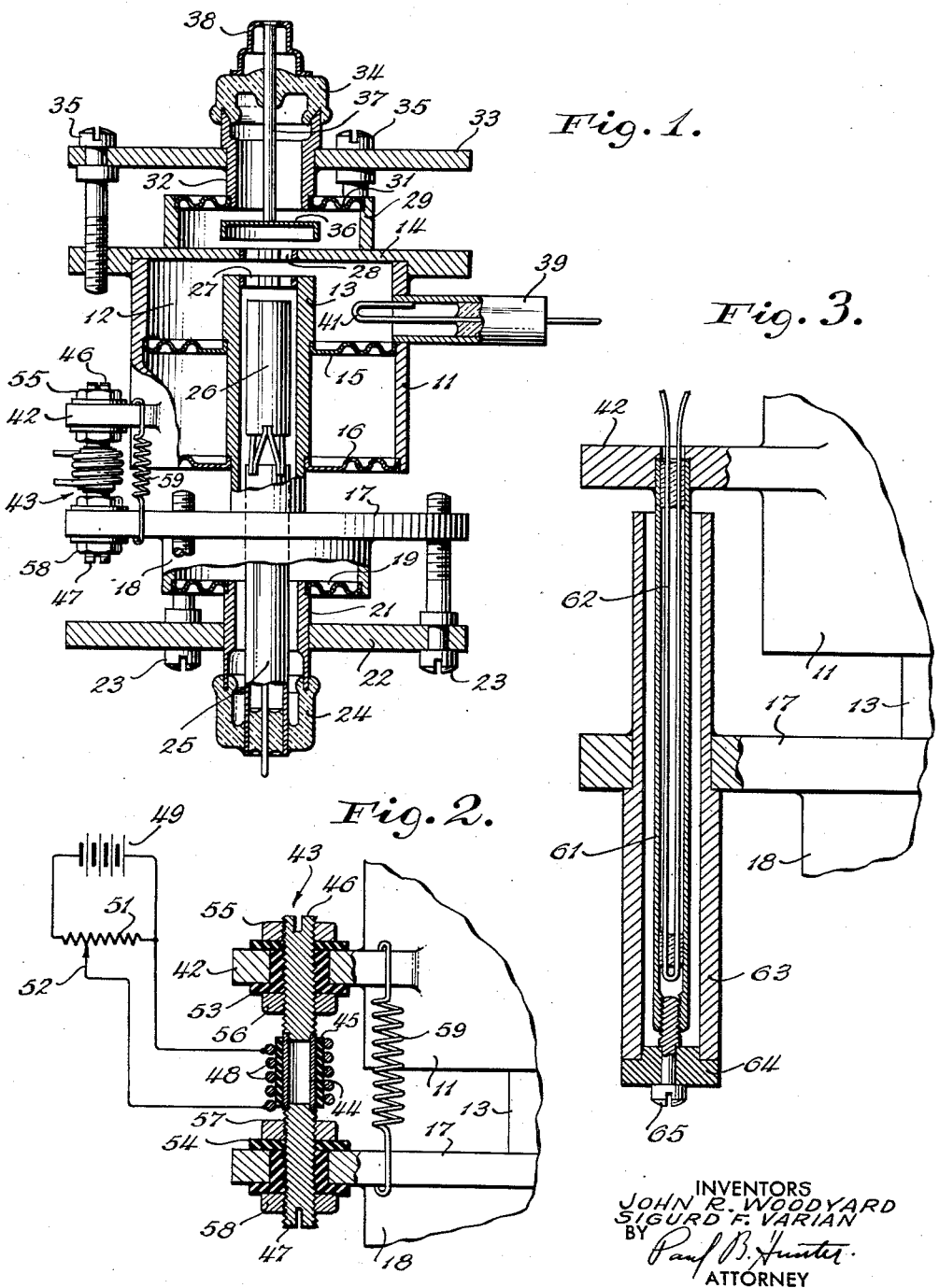
INVENTORS
JOHN R. WOODYARD
SIGURD F. VARIAN
BY
Paul B. Hunter
ATTORNEY June 29, 1954  J. R. WOODYARD ET AL  2,682,623
ELECTRICAL FREQUENCY CONTROL APPARATUS
Filed Dec. 6, 1943  3 Sheets-Sheet 2

INVENTORS
JOHN R. WOODYARD
SIGURD F. VARIAN
BY Paul B. Hunter
ATTORNEY

Patented June 29, 1954

2,682,623

UNITED STATES PATENT OFFICE 2,682,623

ELECTRICAL FREQUENCY CONTROL APPARATUS

John R. Woodyard and Sigurd F. Varian, Garden City, N. Y., assignors, by mesne assignments, to Board of Trustees of the Leland Stanford Junior University Application December 6, 1943, Serial No. 513,090

27 Claims. (Cl. 315—5)

This invention relates to hollow resonator devices and is particularly concerned with electrically energized arrangements and methods for controllably varying the operating frequency of such devices.

The present application is a continuation-in-part of co-pending application Serial No. 428,682 filed January 29, 1942, now Patent No. 2,414,785.

It is a major object of the invention to provide novel electrically energized means and methods for controllably and predictably varying the operating frequency of hollow resonator means.

A further object of the invention is to provide novel electro-mechanical means and methods for controllably and predictably varying the operating frequency of hollow resonator means.

A further object of the invention is to provide novel thermally responsive arrangements for controllably and predictably varying the operating frequency of hollow resonator means.

A further object of the invention is to provide novel electrically energized magnetostrictive arrangements for controllably and predictably varying the operating frequency of hollow resonator means.

It is a further object of the invention to provide novel electrically energized piezoelectric crystal means for controllably and predictably varying the operating frequency of hollow resonator means.

A further object of the invention is to provide novel electro-mechanical arrangements for controlling the operating frequency of electron discharge devices employing deformable hollow resonator means.

A still further object of the invention is to provide an electrically tuned electron beam velocity modulating device.

It is a further object of the invention to provide novel electro-mechanical arrangements for controllably varying the gap between electrodes in a hollow resonator device.

A further object of the invention is to provide novel electrically energized means for controllably deforming a flexible walled hollow resonator device, for varying the natural frequency thereof.

A further object of the invention is to provide novel electrically energized arrangements for controllably varying the size of a frequency control member or strut coupled between movable hollow resonator wall portions.

Figure 1 is an elevation, partly in section, of an electron discharge device of the velocity modulation type embodying a preferred form of the invention;

Figure 2 is an enlarged view, partly in section, illustrating details of the thermally responsive, electrically energized resonator frequency control arrangements of Figure 1;

Figure 3 is a fragmentary view, partly in section, illustrating another embodiment of the thermal tuning phase of the invention;

Figure 8:
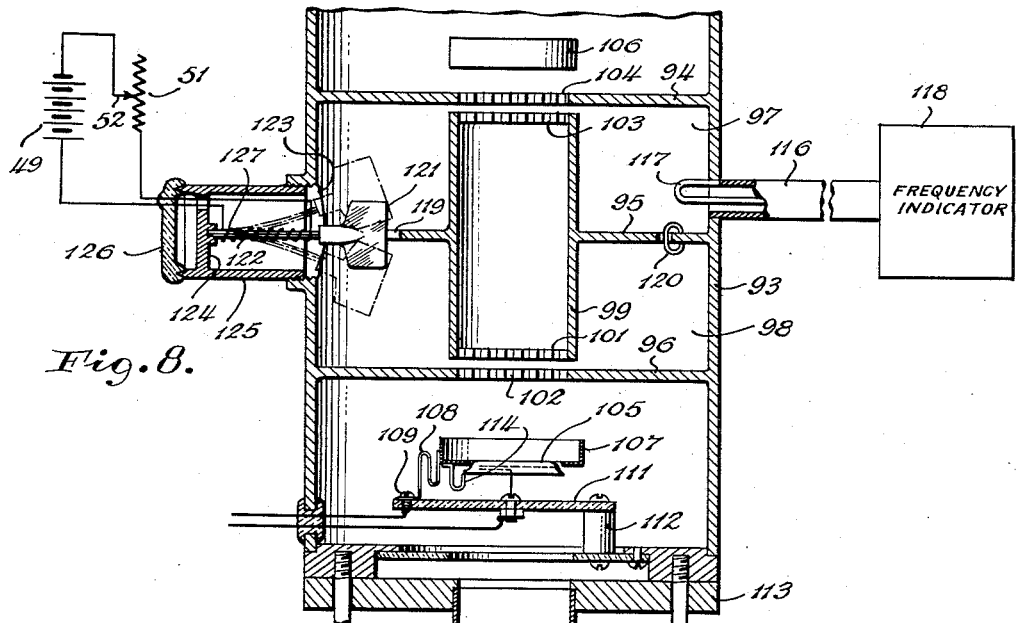
Figure 8 is an elevation, partly in section, illustrating application of frequency control principles of the invention to a two-resonator velocity modulation type oscillator.

In Figure 1, the invention is illustrated as applied to frequency control of an electron discharge hollow resonator device wherein a single hollow resonator is deformable for purposes of varying its operating frequency.

A tubular conductive body member 11 is internally cylindrical to define to the outer side walls of a resonator chamber 12. A hollow cylindrical metal tube 13, coaxial with member 11, extends within member 11 into chamber 12 and terminates adjacent flat end wall 14 of chamber 12. A flexible and deformable end wall 15, generally parallel to wall 14, extends between intermediate portions of tube 13 and member 11.

As illustrated, wall 15 preferably comprises an annularly crimped metal annulus vacuum-sealed at inner and outer peripheries to tube 13 and member 11.

Opposite wall 14, the end of body member 11 is secured to tube 13 by an annularly crimped metal annulus 16 similar and parallel to annulus 15. Beyond annulus 16, tube 13 is fixed to a centrally apertured plate 17 which extends parallel to wall 14.

A short collar 18 coaxial with member 11 is flexibly secured, as by crimped annulus 19, to one end of a hollow thimble 21 which is fixedly mounted in an apertured plate 22 parallel to plate 17. Plates 17 and 22 are interconnected by a plurality of adjustable threaded elements designated at 23 for a purpose to be explained.

Beyond plate 22, the end of thimble 21 is closed by a sealed glass or like insulating cap 24 through which extends a coaxial conductor transmission line 25 for conveying energy to a suitable cathode 26 disposed within tube 13.

The end of tube 13 within the resonator 12 and an aligned aperture in wall 14 are provided with suitable parallel grid electrode structures indicated at 27 and 28.

A short collar 29, coaxial with member 11 is externally fixed to wall 14. Collar 29 is flexibly connected, as by crimped annulus 31, to the inner end of a hollow thimble 32 which is secured in an aperture in plate 33 and has its outer end sealed by a glass or like insulating cap 34.

Plate 33 is parallel to wall 14 and connected thereto by a plurality of adjustable threaded elements 35 for a purpose to be explained.

A cup-shaped metal reflector electrode 36 is mounted in axial alignment with grids 27, 28 and cathode 26 by means of a rigid conductor 37 which extends in sealing relation through cap 34. A metal terminal button 38 is fixed to conductor 37 and is suitably shaped for frictional attachment of a lead for applying a desired potential to reflector 36.

A suitable coaxial-conductor-type transmission line 39 is sealed in a suitable aperture in member 11 and provided with a terminating antenna loop 41 adapted to couple with the electromagnetic field within chamber 12.

Body member 11 is formed with a rigid lug 42, and variable dimension frequency control means such as the strut indicated at 43 in Figure 1, and illustrated in detail in Figure 2, is provided between lug 42 and plate 17.

Referring now to Figure 2, a thin-walled hollow metal tube 44, preferably of aluminum or some material having a high coefficient of thermal expansion and having its outer surface covered with an electrical insulation coating or covering 45, is supported at opposite ends between two adjustable screws 46 and 47, so as to provide a relatively rigid strut of adjustable length between lug 42 and plate 17.

Preferably 45 is in integral anodized coating of aluminum oxide ($Al_2O_3$) formed on tube 44. A coil of resistance heater wire 48 is wound upon covering 45. A suitable controllable electrical power source such as battery 49 is connected to energize coil 48, and the amount of current flow through the resistance wire 48 is controllably variable by means of a rheostat 51. Covering 45 is conductive to heat produced by current flow through coil 48, so that tube 44 is heated proportionately to the current flow determined by the position of movable rheostat tap 52.

Screws 46 and 47 are threadedly mounted in thermal insulating bushings 53 and 54, respectively secured in suitable apertures in lug 42 and plate 17. Bushings 53 and 54 prevent interchange of heat by conduction between one end of the strut and lug 42, and between the other end of the strut and plate 17, and may be formed of any known thermal insulation material which is sufficiently rigid to establish a rigid connection between adjustable screws 46 and 47 and lug 42 and plate 17.

Thus the strut is substantially thermally insulated from the remainder of the hollow resonator device, and heating of the strut may be accurately and measurably controlled by tap 52. Both or either of screws 46 and 47 may be adjusted for varying the effective length of the strut. This adjustment is especially useful as a preliminary or preset adjustment. Lock nuts 55, 56, 57 and 58 are employed to maintain screws 46 and 47 in desired position of axial adjustment.

*Operation*

A stream of electrons is projected from cathode 26 and through grids 27, 28 externally of resonator chamber 12. Reflector 36 is suitably biased to repel the electron stream and redirect it through exit grid 28 into the interior of resonator 12.

Chamber 12 encloses an oscillatory electromagnetic field, the natural frequency of which field is determined mainly by the volume and shape of chamber 12. Deformation or other displacement of any of the chamber walls results in alteration of the distributed capacity and inductance of the oscillatory circuit of chamber 12, and distortion of the field and alteration of the resonant frequency of chamber 12. Grids 27 and 28 bound regions of maximum field intensity so that relative separational movement between grids 27 and 28 will appreciably affect the natural frequency of chamber 12.

As the electron stream initially traverses the gap between grids 27 and 28, the electrons are subjected to velocity modulation by the field between the grids. Electrons are subjected to acceleration and deceleration forces, depending on whether the instantaneous direction of the field is aiding or opposing their travel across the gap. As a result of the above velocity modulation, the electrons along the stream tend to become concentrated in spaced groups during the time the stream leaves and reenters grid 28. The grouped electron stream reenters the gap between the grids in such phase with the field that maximum energy is extracted from the beam by the field, for maintaining oscillation of the field and for supplying energy for extraction by line 39.

The above briefly described velocity modulation theory of operation of the illustrated hollow resonator device is disclosed in United States Patent No. 2,250,511 to which reference is made for further detail. The present invention is, however, relatively independent of such velocity modulation theory, being directed to arrangements for controllably varying the resonator frequency.

Energization of coil 48 proportionately heats tube 44. During normal operation, coil 48 preferably maintains tube 44 at a temperature well above prevailing ambient temperatures so that frequency control may be had in either direction, and suitable arrangements (not shown) for shielding tube 44 may be provided if desirable.

When tube 44 becomes increasingly heated, it expands. Longitudinal expansion of tube 44 results in increased separation of lug 42 and plate 17, which is translated into increased separation of grids 27 and 28 to thereby increase the natural frequency of chamber 12. When tube 44 is decreasingly heated, or permitted to cool, longitudinal contraction thereof results in decreased separation of grids 27 and 28 and consequent lowering of the natural frequency of resonator chamber 12. The natural frequency of resonator chamber 12 can therefore be accurately variably controlled by shifting tap 52, and if desired this tap adjustment may be suitably calibrated in terms of the frequency of resonator 12. Thin-walled tube 44 expands and contracts with a minimum of time delay due to its large radiation surface area and small volume.

Flexible wall 15 permits such deformation of the resonator as is necessary for the above frequency control, while maintaining the vacuum within the device. Parallel annuli 15 and 16 steady tube 13 and provide substantially axial displacement thereof. Threaded elements 23 and 35 provide for preliminary axial alignment adjustments of the cathode and reflector respectively.

Coil 48 has been illustrated diagrammatically as a conventional coil. In practice, however, we prefer to wind the resistance wire non-inductively on tube 44 so as to avoid possible magnetic disturbance of the electron beam from cathode 26.

If desired, heating of tube 44 may be accomplished by any suitable arrangement of resistance wire providing a radiant heat source within or about tube 44 without departing from the spirit of the invention.

Flexible wall 15 may be sufficiently resilient to effect movement of lug 42 and plate 17 toward each other when the strut cools, or if desired a tension spring 59 may be provided to insure that return. Spring 59 of course, would not be strong enough to oppose expansion of tube 44.

Positive bidirectional control of the grid separation and resonator frequency may be obtained by making tube 44 rigid or substantially integral with elements 46 and 47, as by soldering after assembly and preliminary adjustment.

The above exemplifies an embodiment of the invention known as thermal tuning. If desired two or more circumferentially spaced struts 43 may be employed.

Further embodiments

Another embodiment of thermal tuning which may be applied to the device of Figure 1 is illustrated in Figure 3, wherein lug 42 has secured thereto one end of a relatively small bore thin-walled tube 61 of aluminum, duralumin or some other material having a relatively high coefficient of thermal expansion. A loop of resistance heater wire 62 is insulatingly supported within tube 61 for heating the latter uniformly along its length, and is suitably controllably energized similarly to coil 48.

Tube 61 extends coaxially within a surrounding larger bore rigid tube 63 which is fixed intermediate its ends within a suitable aperture in plate 17. A suitable plug 64 closes the end of tube 63. An adjustable screw 65 mounted on plug 64 is threadedly engaged with the adjacent end of tube 61, so that rotation of screw 65 effects axial displacement of tube 61 and variation of the relative separation of lug 42 and plate 17.

Tube 63 is preferably made of Invar or some other material having a relatively low coefficient of thermal expansion. Extension of tube 63 beyond plate 17 permits the use of a tube 61 which is longer than the distance between lug 42 and plate 17. Since tube 63 has little or no expansion when heated, the above described arrangement provides a compound strut wherein the long expansible tube 61 when heated affords relatively large displacement between lug 42 and plate 17, thereby giving wide range control of the resonator frequency.

Thin-walled tube 61 expands and contracts with a minimum of time delay due to its thinness and large radiation surface. The portions of tube 63 between lug 42 and plate 17 serve as a draft shield for tube 61, but may be omitted if desired without affecting the above operation. Further, member 63 need not be a tube as shown but may comprise any suitable rigid extension of plate 17.

In operation, the thermal tuning arrangement of Figure 3 functions and is controlled similarly to that of Figure 1 above described.

Figure 4:
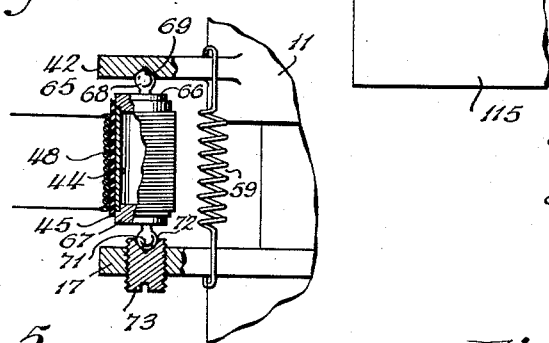
Figures 4, 5, 6 and 7 are partially sectional views similar to Figure 2 and illustrating further electro-mechanical means for controlling the resonator frequency, said figures illustrating further thermal, magnetostrictive and two piezoelectric crystal tuning arrangements.

The thermal tuning arrangement illustrated in Figure 4 is similar to that of Figure 2 in that it embodies a thin-walled metal tube 44 wound about with a non-inductive heater coil 48. The opposite ends of tube 44 are fixed to support plugs 66 and 67. Plug 66 is formed with a ball end 68 adapted to seat in a suitable surface socket 69 on lug 42. Plug 67 is formed with a ball end 71 adapted to seat within a suitable socket 72 on the end of screw 73 threadedly mounted in plate 17.

Each end of the thermal tuning strut is thus substantially universally connected to the associated resonator parts, and such universal connection affords a minimum of metal to metal contact so that there is little or no exchange of heat by conduction at the ball and socket joints.

Operation of the arrangement of Figure 4 is similar to that of Figure 2, spring 59 preventing mechanical play.

Figure 5:
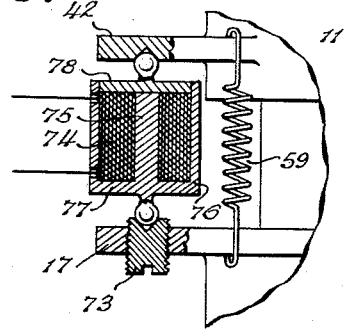

In Figure 5, a suitably wound magnetizing coil 74 is disposed about a core 75 and surrounded by a shell 76. The shell is closed at opposite ends by walls 77 and 78 having ball and socket connection with lug 42 and screw 73 similarly to Figure 4. Wall 78 is separable from the shell for insertion of coil 74. The illustrated terminals of coil 74 are connected to a suitable variable source of electrical energy similarly to Figure 2.

Core 75 and shell 76 are preferably made of nickel, iron, Nichrome or some other material which is magneto-strictive, and which contracts or expands proportionately to increasing degrees of magnetization under the control of electrical energization of coil 74. Thus the length of the magnetostrictive strut of Figure 5 varies with the amount of power supplied to coil 74 from battery 49, and correspondingly the natural frequency of resonator chamber 12 is controllably and predictably varied. Spring 59, as in Figure 4, maintains close contact between lug 42 and plate 17 and the strut ends, and thereby insures movement of the resonator grids together.

Figure 6:
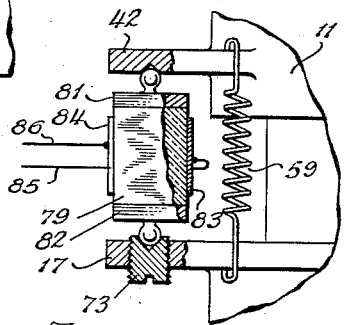
Figure 7:
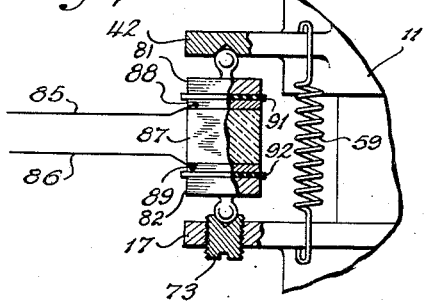

Figures 6 and 7 illustrate further embodiments of the invention wherein electrical energization of piezo-electric crystal substances is employed for electro-mechanical tuning.

A suitably cut block 79 of piezo-electro material, such as quartz, tourmaline, Rochelle salts or the like, has opposite end surfaces suitably rigidly secured to steel plates 81 and 82 which have universal ball and socket connections to lug 42 and plate 17, similarly to Figure 4.

Electrodes 83 and 84 are secured to two other opposite faces of block 79. These electrodes may comprise metal foil sheets suitably cemented onto the associated crystal surfaces, and have potential applying leads 85 and 86 which are preferably connected to the battery and variable rheostat shown as in Figure 2.

In the embodiment illustrated in Figure 7, a suitably cut block 87 of piezo-electric material has secured to opposite end faces metal electrodes 88 and 89 which serve as terminals for applying a voltage across the crystal. Here electrodes 88 and 89 are electrically insulated from force transmitting plates 81 and 82, as by suitable insulation members 91 and 92, the assembly being preferably cemented together in sandwich formation. Leads 85 and 86 are connected to electrodes 88 and 89 as in Figure 6.

Thus the voltage across either crystal 79 or 87 may be varied by adjustment of tap 52. When the voltage is increased, crystal 79 or 87 expands in known fashion thereby increasing separation of grids 27 and 28, and the reverse operation takes place when the voltage is reduced. Since the involved properties of such crystals are known, further explanation of this phase of the invention is not needed.

If desired, instead of the ball and socket joints between the strut ends and the associated resonator parts shown in Figures 4–7, the opposite strut ends could be rigidly secured to lug 42 and plate 17, and spring 59 could be omitted since the frequency control movements would then be positive bidirectionally.

Figure 8 illustrates a further embodiment of the invention wherein frequency control is accomplished by electro-mechanical regulation of the position of a conductive member disposed at least in part within a hollow resonator field.

The electron discharge device illustrated in Figure 8 comprises a tubular cylindrical body member 93 provided with three parallel spaced walls 94, 95, 96 which define spaced resonator chambers 97 and 98. Wall 95 is centrally apertured to accommodate a hollow drift tube 99, rigid therewith, and the opposite ends of tube 99 and the adjacent walls 94 and 96 are provided with aligned grid structures 101, 102 and 103, 104.

A suitable cathode 105 is provided for projecting a beam of electrons axially of member 93 toward a suitably mounted electron collector device 106 beyond grid 104. An annular beam focusing electrode 107 surrounds the electron stream and is supported upon a spring metal clip 108 secured to terminal 109 on an insulating plate 111. Plate 111 is rigid with a suitable supporting post 112 upstanding from the bottom end wall 113 of the device.

As illustrated, cathode 105 is mounted on a spring clip 114 attached to ring electrode 107, and suitable leads are introduced through an aperture in member 93 for energizing the cathode and ring electrode. The entire volume within the device is evacuated, as by pump connection 115.

A coaxial line 116 having a terminal loop 117 coupled with the field within resonator 97 is adapted to extract energy from that field. The frequency of that energy may be measured by a suitable indicator as at 118. A suitable coupling loop 120 couples together the fields within resonators 97 and 98, thus feeding back energy from resonator 98 to maintain oscillations in resonator 97. The common resonator wall 95 is suitably apertured at 119 to accommodate a flat blade or paddle member 121 which projects into both resonator fields as illustrated. Member 121 is carried on one end of a flexible bimetallic spring strip 122 which extends freely through a suitable aperture 123 in member 93 and is anchored at its other end upon an abutment 124 rigidly carried by a short tube 125 threadedly mounted in aperture 123. Strip 122 is so biased that when cold it assumes the indicated lower dotted line position. When heater coil 127 has maximum energization, strip 122 may be flexed thereby to its upper dotted line position. The solid line medial position of strip 122 is indicated in Figure 8.

The outer end of tube 125 is provided with a glass or like seal 126 to maintain the vacuum. A heater coil 127 wound about strip 122 is energized from battery 49 and rheostat 51.

In operation, the electron stream from cathode 105 is velocity modulated while passing between grids 102, 101, becomes velocity grouped during passage along drift tube 99, and passes between grids 103, 104 where energy is extracted from the stream by the electro-magnetic field within resonator 97. Accepted theories of operation of such devices are disclosed in United States Letters Patent No. 2,259,690 to which reference is made for further detail if needed.

Blade 121 effectively comprises part of each of the conductive inner resonator surfaces bounding the electromagnetic fields therein. Hence the above described displacement of blade 121 will effect deformation of the resonator boundaries and the fields therein with resultant relative changes in frequency.

Since the fields within resonator 97 and 98 are designed to oscillate at the same frequency, being coupled through loop 120, the frequency control effected by variation of paddle 121 between its illustrated dotted line limiting positions is utilizable to obtain a condition of maximum power output for the oscillator.

It is clear that the operating frequency of each resonator may be varied by adjustment of rheostat 51 to vary the heating of coil 127.

Figure 9:
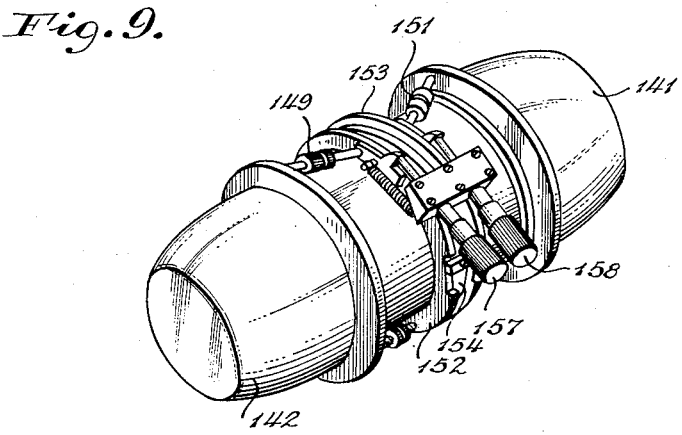
Figure 9 is a perspective view of a hollow resonator device having externally adjustable tuning struts, to which the invention is applied.
Figure 10:
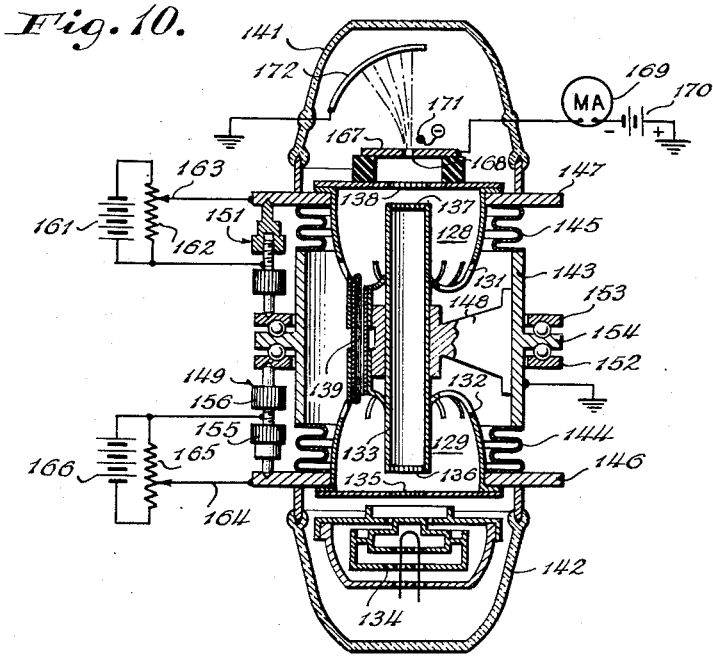
Figure 10 is an axial section through the hollow resonator device of Figure 9.

Figures 9 and 10 illustrate the invention as applied to a hollow resonator device of the type illustrated in United States Letters Patent No. 2,242,249.

Briefly, that device comprises hollow resonators 128 and 129 formed with flexible adjacent end walls 131 and 132 secured to an elongated drift tube 133. A suitable cathode assembly 134 is mounted at one end of the device arranged to project an electron beam through input grids 135, 136 and output grids 137, 138. The resonator fields are coupled by a suitable telescoping antenna assembly designated at 139.

The resonators and cathode are enclosed in a vacuum-tight chamber provided by glass end cups 141, 142 sealed to a longitudinally expansible body made up of a tubular member 143 attached at opposite ends by flexible Sylphons 144, 145 to annular plates 146, 147 rigid with grids 135 and 138 respectively. Member 143 rigidly supports drift tube 133, as by bracket 148.

Frequency control of the resonators in this device is effected by varying the effective axial length of metal struts 149 and 151 extending between plates 146, 147 and parallel rotatable bearing annuli 152, 153 in ball bearing engagement with a rigid flange 154 on tube 143.

Each strut 149 and 151 consists of a pair of threadedly interconnected parts 155 and 156 for preliminarily adjustably selecting the overall length of each strut. Moreover, as shown in Figure 9, each strut 149 and 151 is placed at an angle to the longitudinal axis of the device so that when either of plates 152 or 153 is rotated, as by manipulation of micrometer assemblies 157, 158, the effective strut length relating to the axis of the device is changed to thereby alter the associated resonator grid spacing and operating frequency.

The above purely mechanical manner of frequency control is not part of the present invention, and reference is made to said Patent No. 2,242,249 for further detail.

A suitable battery 161 is provided with a parallel resistor 162 having a variable tap 163. As illustrated this variable power source is connected between a central point of strut 151 and its two ends which are grounded by connection to the grounded casing 143. Since strut 151 is of metal, it is heated by passage of electric current therealong.

By adjusting tap 163, the heating power delivered to strut 151 may be controllably varied, thereby controllably varying the length of the strut through its thermal expansion characteristics. The same electro-mechanical variable control of the length of strut 149 may be accomplished by a regulation of a tap 164, which is adjustable along a resistor 165 arranged in parallel across a second battery 166. These electromechanical adjustments effect frequency control by controlling the resonator grid spacing as above explained.

Any suitable method may be employed for indicating or measuring changes in oscillation frequency due to manipulation of the tuning controls. For example an arrangement found to be satisfactory is illustrated within cup 141 in Figure 10. After emerging from exit grid 138, the electron beam falls on a metal plate 167 which is centrally apertured at 168 to permit passage of a thin pencil of electrons from the center of the beam. Plate 167 is insulatingly supported relative to the resonator shell as illustrated and is connected to ground through a milliammeter 169 and biasing battery 170 so that it may serve as a detector.

The electron ray pencil emerging from aperture 168 continues past a negatively charged rod 171, suitably supported within the assembly. The individual electrons in the ray pencil are deflected by action of the negatively charged rod more or less from their straight paths depending upon their velocities. An arcuate fluorescent screen 172, suitably grounded to the resonator frame as indicated is mounted in the path of the deflected beam.

In practice it has been found satisfactory to make aperture 168 a slit about 1 mm. by 5 mm.; and to locate rod 171, which is about one-eighth inch in diameter, about one-quarter of an inch away from plate 167 and about three-sixteenths of an inch to one side of the emergent ray pencil. The arrangement was known as a repulsion velocity spectrograph.

Electro-thermal frequency control of the oscillator was indicated and observed as below explained. The emergent electron ray pencil from aperture 168 was of course velocity modulated due to operation of the device as explained in said Patent No. 2,242,249. The device was first tuned manually, by adjustment of micrometers 157, 158 until the oscillator output was at maximum. At maximum oscillation, the electron grouping in the beam is sharpest, and this condition may be observed by the nature of the track which the ray pencil traces on screen 172.

Furthermore, in normal operation, plate 167 is so negatively biased as to repel electrons of average or less velocity. Hence, under conditions of no oscillation substantially no electrons will strike plate 167 and there will be no indication on milliammeter 169. During oscillation, certain of the electrons attain higher than average velocity and hence will strike plate 167. As the amplitude of oscillation increases, the number of electrons striking plate 167 increases, so that the detector current indication on milliammeter 169 increases. This detector action is similar to that disclosed in U. S. Letters Patent No. 2,280,824.

The velocity spectrograph screen 172, or milliammeter 169, are thus indicators of oscillation amplitude. Moreover, changes in resonator frequency and oscillation frequency may be readily inferred and ascertained from their indications in the manner explained below.

The input resonator strut 149 was heated by energization from battery 166. This caused elongation of strut 149, and increased separation of grids 135, 136 with consequent change in the natural frequency of resonator 129. That there was such a frequency change was indicated by the drop in output of the oscillator as observed on milliammeter 169 and by the decreased track length on screen 172. The oscillator was then restored to maximum output simply by manually or thermally adjusting strut 151 until resonator 128 was of the same natural frequency as the new frequency of resonator 129.

Another manner of observing frequency changes in the oscillator is to simply provide a suitable energy leaking aperture in a wall of resonator 128, and measure the high frequency output radiation from that aperture as by a crystal detector and frequency meter assembly.

If desired, any of the electro-mechanical strut length controls illustrated in Figures 2, 3, and 4–7 could be employed in place of struts 149 and 151 in the device of Figures 9 and 10.

The above described invention, in its various embodiments, is peculiarly adapted to automatic frequency control systems for hollow resonator devices, by deriving power for energizing the struts from a suitable frequency sensitive system coupled to the oscillator output, so as to maintain the oscillator frequency at a desired value.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency tube structure comprising a hollow resonator having relatively movable portions, a thermal extensible and contractible member included between said relatively movable portions, and means for varying the temperature of said member to produce variations in the length thereof and the tuning of said resonator.

2. An electric discharge device comprising means for producing a stream of electrical charges, a hollow body electromagnetic resonator interposed in the path of said stream, and thermally controlled means for varying the resonant frequency of said resonator.

3. An electric discharge device comprising means for producing a stream of electrical charges, a hollow-body resonator interposed in the path of said stream, a portion of said resonator being capable of change in position to vary the resonant frequency of said resonator, and thermal means connected to said portion for changing the position of said portion to vary the resonant frequency of said resonator.

4. An ultra-high frequency device comprising a container, a plurality of electrodes therein defining a discharge path, hollow-body resonator means in said path, said resonator means including a portion movable relative to the remainder of said resonator means, means actuatable in response to temperature changes for moving said portion relative to said remainder, and temperature varying means cooperative with said actuatable means for determining the position of said portion.

5. An electric discharge device comprising a hollow-body resonator, a cathode, and means for bunching electrons emitted from said cathode and causing the bunched electrons to give up energy in said resonator, in combination with mechanical means for altering the distributed capacity and inductance of said resonator and thermal means for actuating said mechanical means.

6. An electric discharge device comprising a hollow-body resonator, a cathode, and means for bunching electrons emitted from said cathode and causing the bunched electrons to give up energy in said resonator, in combination with mechanical means for altering the distributed capacity and inductance of said resonator and electrically heated thermal means for actuating said mechanical means.

7. Electron discharge apparatus comprising means defining a hollow resonator adapted to provide an electromagnetic field, means operably connected to said resonator shiftable for changing electrical characteristics of said resonator for changing the oscillatory frequency of said field, and electrically energized means coupled to said shiftable means for controllably actuating said shiftable means for predictably controlling the frequency of said field.

8. The electron discharge apparatus defined in claim 7, wherein said electrically energized means comprises means expansible and contractible with changes in temperature thereof operatively connected to said shiftable means, and electrical means for controllably varying the temperature of said expansible and contractible means.

9. The electron discharge apparatus defined in claim 7, wherein said electrically energized means comprises a magneto-strictive member operatively connected to said shiftable means, and electrical means for controlling magnetization of said member.

10. The electron discharge apparatus defined in claim 7, wherein said electrically energized means comprises a piezo-electric member operatively connected to said shiftable means, and electrical means for controlling a dimension of said member.

11. The electron discharge apparatus defined in claim 7, wherein said shiftable means comprises a movable conductive member the position of which determines certain electrical characteristics of said field.

12. The electron discharge apparatus defined in claim 7, wherein said shiftable means comprises a movable portion of the resonator wall enclosing said field.

13. High frequency apparatus comprising a deformable hollow resonator forming an electromagnetic circuit element, and electromechanical means operatively connected to said resonator for variably controlling the shape and volume of said resonator and thereby controlling the frequency of oscillation of said circuit.

14. High frequency apparatus comprising a deformable hollow resonator forming an electromagnetic circuit element, and thermally responsive means operatively connected for variably controlling deformation of said resonator and thereby controlling the frequency of oscillation of said circuit.

15. High frequency apparatus comprising a hollow resonator having a plurality of relatively movable wall portions, and means for controllably effecting relative movement between said wall portions comprising expansible and contractible means connected between said wall portions and electrically energized means for actuating said expansible and contractible means.

16. Electron discharge apparatus comprising a hollow resonator having portions relatively movable for changing the frequency of the oscillatory circuit of said resonator, strut means operatively connected between said portions, and electrical means operable on said strut means for varying a dimension of said strut means to effect said relative movement of said portions.

17. The electron discharge aparatus defined in claim 16, wherein said strut means comprises a member having a relatively high coefficient of thermal expansion, and said electrical means comprises means for heating said member.

18. The electron discharge apparatus defined in claim 16, wherein said resonator portions are flexibly interconnected.

19. Electron discharge apparatus comprising a hollow resonator having relatively movable wall portions provided with adjacent electron permeable regions, means interconnecting said wall portions comprising a thermally responsive expansible and contractible member, and means for variably controlling the temperature of said member.

20. Electron discharge apparatus comprising a hollow resonator having relatively movable wall portions provided with aligned electron permeable regions, means for projecting an electron beam through said regions, a thermally responsive expansible and contractible member extending substantially parallel to said beam operatively connected at opposite ends to said wall portions, and means for varying the temperature of said member for predictably controlling the frequency of said resonator.

21. The apparatus defined in claim 20, including spaced means rigid with the respective resonator wall portions, and means connecting said member at opposite ends to said spaced means, said member being longer than the distance between said spaced means.

22. Electron discharge apparatus comprising a hollow resonator having relatively movable wall portions provided with aligned electron permeable regions, a relatively thin walled tube, having an appreciable coefficient of thermal expansion operatively connected at opposite ends to said wall portions, and electrical heater means mounted in operative association with said tube for variably controlling the temperature and consequently the length of said tube.

23. The apparatus defined in claim 22, wherein said electrical heater means comprises a filamentary resistance element disposed within and extending substantially the length of said tube for uniformly heating said tube along its length.

24. The apparatus defined in claim 22, wherein said tube is at least partly surrounded by a spaced shield protecting the tube from drafts and the like.

25. Electron discharge apparatus comprising a hollow resonator having a rigid wall at one end and a flexible wall at the other end, grids mounted in axial alignment on said walls, spaced members substantially rigid with the respective grids, and a thermally responsive expansible and contractible tuning strut interconnecting said members.

26. Electron discharge tube structure comprising means defining a hollow resonator having a pair of relatively movable frequency control members, a strut interconnecting said members, and electrically energized means for variably controlling a dimension of said strut for thereby controlling relative frequency control movement of said member.

27. Electron discharge apparatus comprising means defining a hollow resonator having a pair of relatively movable frequency control members, a strut interconnecting said member, said strut being adapted to change at least one dimension in response to temperature changes, and means for controllably varying the temperature of said strut, for predictably altering the frequency of said resonator.

References Cited in the file of this patent

UNITED STATES PATENTS

| Number | Name | Date |
|---|---|---|
| 1,658,953 | Theremin | Feb. 14, 1928 |
| 2,079,809 | Kuhle et al. | May 11, 1937 |
| 2,095,981 | Hansell | Oct. 19, 1937 |
| 2,109,880 | Dow | Mar. 1, 1938 |
| 2,146,365 | Batchelor | Feb. 7, 1939 |
| 2,183,215 | Dow | Dec. 12, 1939 |
| 2,216,170 | George | Oct. 1, 1940 |
| 2,251,085 | Unk | July 29, 1941 |
| 2,304,186 | Litton | Dec. 8, 1942 |
| 2,323,735 | Tawney | July 6, 1943 |
| 2,337,214 | Tunick | Dec. 21, 1943 |
| 2,568,325 | Diamond | Sept. 18, 1951 |

FOREIGN PATENTS

| Number | Country | Date |
|---|---|---|
| 422,869 | Great Britain | Jan. 21, 1935 |
| 537,518 | Great Britain | June 25, 1941 |

OTHER REFERENCES

Journal of Applied Physics, vol. 10, No. 5, May 1939, pages 321–327.